(12) United States Patent
Xu

(10) Patent No.: US 10,663,168 B2
(45) Date of Patent: May 26, 2020

(54) END RAIL MATE-FACE LOW PRESSURE VORTEX MINIMIZATION

(71) Applicant: United Technologies Corporation, Farmington, CT (US)

(72) Inventor: JinQuan Xu, East Greenwich, RI (US)

(73) Assignee: Raytheon Technologies Corporation, Farmington, CT (US)

( * ) Notice: Subject to any disclaimer, the term of this patent is extended or adjusted under 35 U.S.C. 154(b) by 266 days.

(21) Appl. No.: 15/666,958

(22) Filed: Aug. 2, 2017

(65) Prior Publication Data
US 2019/0041060 A1    Feb. 7, 2019

(51) Int. Cl.
| | |
|---|---|
| F23M 5/08 | (2006.01) |
| F23R 3/06 | (2006.01) |
| F02C 7/18 | (2006.01) |
| F23R 3/00 | (2006.01) |
| F23R 3/04 | (2006.01) |

(52) U.S. Cl.
CPC .............. *F23R 3/04* (2013.01); *F02C 7/18* (2013.01); *F23M 5/085* (2013.01); *F23R 3/002* (2013.01); *F23R 3/06* (2013.01); *F05D 2220/32* (2013.01); *F05D 2230/60* (2013.01); *F05D 2240/35* (2013.01); *F05D 2260/202* (2013.01); *F23R 2900/03041* (2013.01)

(58) Field of Classification Search
CPC .......... F23R 2900/030401; F23R 2900/03042; F23R 2900/030403; F23R 2900/030404; F23R 3/002; F23R 3/04; F23R 3/06; F05D 2240/35; F05D 2260/201; F05B 2260/202
See application file for complete search history.

(56) References Cited

U.S. PATENT DOCUMENTS

| | | | | |
|---|---|---|---|---|
| 4,485,630 A | * | 12/1984 | Kenworthy | ............. B23P 15/00 416/97 R |
| 5,079,915 A | | 1/1992 | Veau | |
| 6,029,455 A | | 2/2000 | Sandelis | |
| 6,470,685 B2 | * | 10/2002 | Pidcock | .................. F23R 3/002 60/752 |
| 6,543,233 B2 | * | 4/2003 | Young | ...................... F23R 3/08 60/752 |
| 7,849,694 B2 | | 12/2010 | Dahlke et al. | |

(Continued)

FOREIGN PATENT DOCUMENTS

| | | |
|---|---|---|
| EP | 2952812 | 12/2015 |
| EP | 3009600 | 4/2016 |

(Continued)

OTHER PUBLICATIONS

International Preliminary Report on Patentability for International Application No. PCT/US2018/044985 dated Feb. 13, 2020.

*Primary Examiner* — Todd E Manahan
*Assistant Examiner* — David P. Olynick
(74) *Attorney, Agent, or Firm* — Carlson, Gaskey & Olds, P.C.

(57) ABSTRACT

A combustor assembly for a turbine engine includes a liner panel defining a portion of an inner surface of a combustor chamber. The liner panel includes an end face transverse the inner surface and at least one diffuser through the end face. A method of assembling a combustor for a turbine engine is also disclosed.

13 Claims, 4 Drawing Sheets

(56) References Cited

U.S. PATENT DOCUMENTS

| | | | |
|---|---|---|---|
| 2007/0283700 A1* | 12/2007 | Gerendas | F23R 3/002 60/754 |
| 2009/0067998 A1* | 3/2009 | Beck | F01D 5/186 415/175 |
| 2010/0095679 A1* | 4/2010 | Rudrapatna | F23R 3/005 60/752 |
| 2013/0025287 A1* | 1/2013 | Cunha | F23R 3/002 60/772 |
| 2015/0300645 A1 | 10/2015 | Jopp et al. | |
| 2015/0354826 A1* | 12/2015 | Rudel | F23R 3/50 60/798 |
| 2016/0054001 A1* | 2/2016 | Bangerter | F23R 3/005 60/772 |
| 2017/0356653 A1* | 12/2017 | Bagchi | F23R 3/002 |

FOREIGN PATENT DOCUMENTS

| | | | | |
|---|---|---|---|---|
| EP | 3183497 | | 6/2017 | |
| GB | 2298266 A | * | 8/1996 | F23R 3/002 |
| WO | WO-2015077600 A1 | * | 5/2015 | F23R 3/06 |

* cited by examiner

END RAIL MATE-FACE LOW PRESSURE VORTEX MINIMIZATION

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

The combustor section includes a chamber where the fuel/air mixture is ignited to generate the high energy exhaust gas flow. The temperatures within the combustor chambers are typically beyond practical material capabilities. Therefore a cooling airflow is provided across an exposed surface of liner panels provided within the chamber. The cooling airflow impinges on the liner panel and also is injected along the surface of the liner panel to provide an insulating film of cooling air. Disruptions or gaps in cooling airflow may result in temperatures greater than desired in certain portions of the liner panel. Higher localized liner panel temperatures can result in premature degradation and loss of combustor efficiency.

SUMMARY

In a featured embodiment, a combustor assembly for a turbine engine includes a liner panel defining a portion of an inner surface of a combustor chamber, liner panel including an end face transverse the inner surface, and at least one diffuser through the end face.

In another embodiment according to the previous embodiment, the diffuser includes a diffuser portion on the end face and a metering portion through the end face into the diffuser portion.

In another embodiment according to any of the previous embodiments, the end face is on an aft end of the liner panel.

In another embodiment according to any of the previous embodiments, the diffuser is a groove diffuser that extends across the end face. A plurality of metering portions open into the groove diffuser.

In another embodiment according to any of the previous embodiments, includes a second liner panel disposed adjacent the aft end. The second liner panel includes a forward end separated from the aft end by a gap.

In another embodiment according to any of the previous embodiments, the liner panel includes a plurality of liner panels arranged circumferentially about the engine axis and the second liner panel includes a plurality of second liner panels arranged circumferentially about the engine axis.

In another embodiment according to any of the previous embodiments, the inner surface includes a plurality of cooling air holes injecting cooling air into through first liner panel.

In another embodiment according to any of the previous embodiments, the diffuser includes a forward expansion angle relative to a longitudinal axis of the diffuser that is between zero and 45°.

In another embodiment according to any of the previous embodiments, the diffuser includes a lateral expansion angle relative to the longitudinal axis of the diffuser that is between 5° and 45°.

In another embodiment according to any of the previous embodiments, the diffuser includes a lateral expansion angle relative to the longitudinal axis of the diffuser that is 45°.

In another embodiment according to any of the previous embodiments, the diffuser includes a forward expansion angle of between 5° and 45°.

In another embodiment according to any of the previous embodiments, the diffuser includes a forward expansion angle is 45°.

In another embodiment according to any of the previous embodiments, the forward expansion angle and the lateral expansion angle are the same.

In another embodiment according to any of the previous embodiments, the forward expansion angle and the lateral expansion angle are different.

In another featured embodiment, a liner panel for a combustor assembly of a gas turbine engine includes a surface defining an inner surface of a combustor, an end face transverse to the inner surface, and at least one diffuser through the end face.

In another embodiment according to any of the previous embodiments, the diffuser includes a diffuser portion on the end face and a metering portion through the end face into the diffuser portion.

In another embodiment according to any of the previous embodiments, the diffuser includes a forward expansion angle relative to a longitudinal axis of the diffuser that is between zero and 45° and a lateral expansion angle relative to the longitudinal axis of the diffuser that is between 5° and 45°.

In another featured embodiment, a method of assembling a combustor for a turbine engine includes forming a first liner panel to include a surface, an aft end transverse to the surface and at least one diffuser with the aft end. The first liner panel is assembled within an outer wall of a combustor to define an inner surface of the combustor. A second liner panel is assembled separated from the aft end of the first liner panel by a gap.

In another embodiment according to any of the previous embodiments, includes forming the diffuser to include a diffuser portion and a cooling air hole through the end face into the diffuser portion.

In another embodiment according to any of the previous embodiments, includes forming the diffuser portion to include includes a forward expansion angle relative to a longitudinal axis of the diffuser that is between zero and 45° and a lateral expansion angle relative to the longitudinal axis of the diffuser that is between 5° and 45°.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
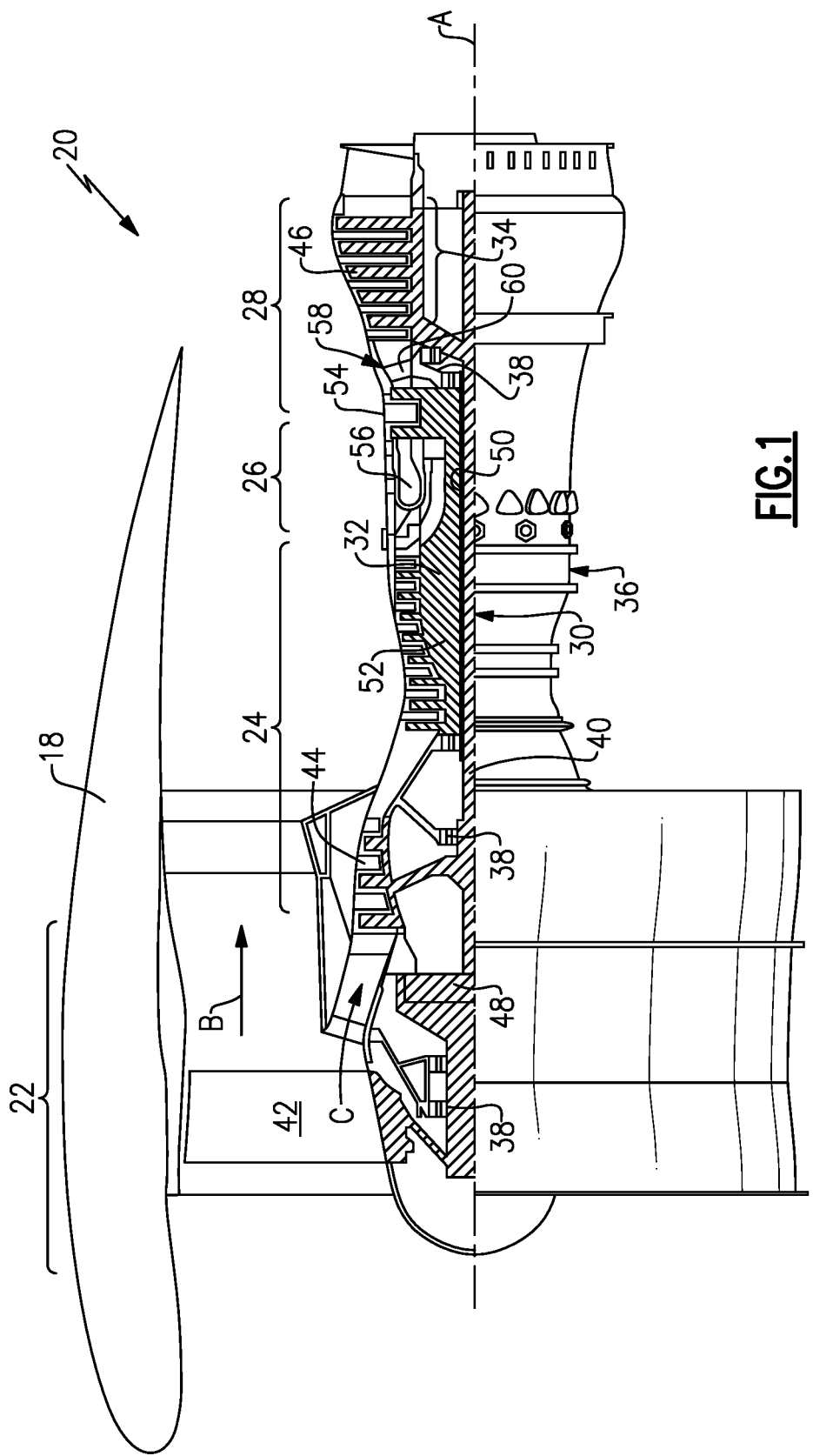
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 18. The compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. Moreover, although FIG. 1 illustrates a gas turbine engine 20 utilized for aircraft propulsion, land based turbine engines utilized for power generation or other purposes would also be recognized as benefiting from the disclosures herein.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low pressure) compressor 44 and a first (or low pressure) turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The high speed spool 32 includes an outer shaft 50 that interconnects a second (or high pressure) compressor 52 and a second (or high pressure) turbine 54. A combustor assembly 56 is arranged in the exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed with fuel in the combustor assembly 56, ignited to generate a high-energy gas flow that is then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. The low pressure turbine 46 pressure ratio is pressure measured prior to inlet of the low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
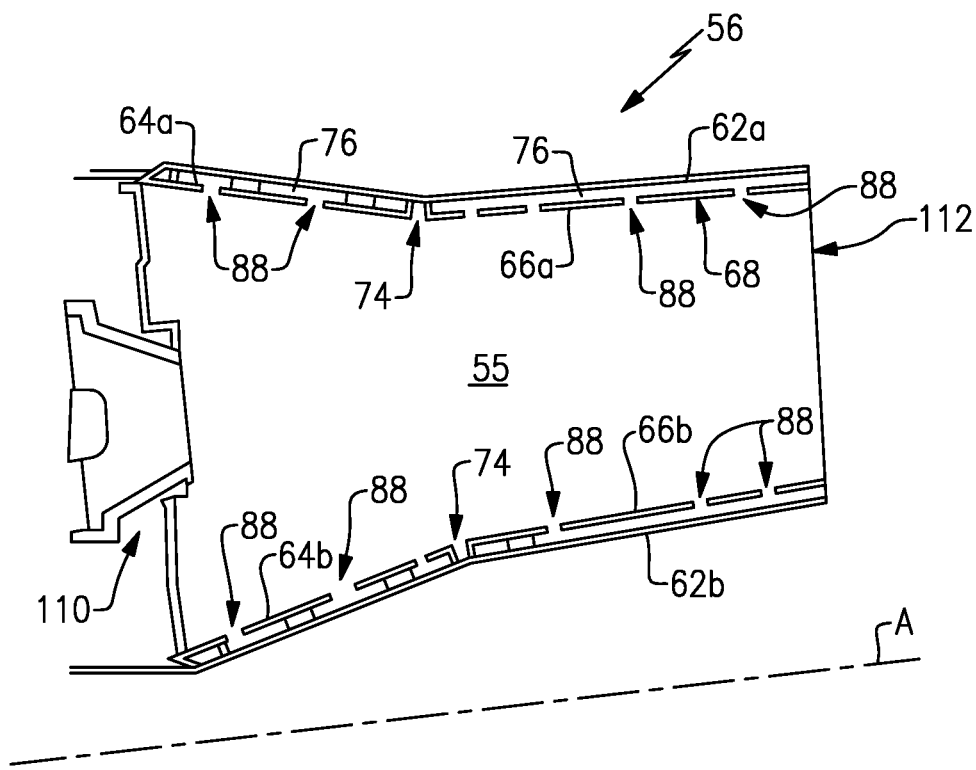
FIG. 2 is a cross-section of an example combustor assembly.

Referring to FIG. 2, the example combustor assembly 56 includes a radially outer wall 62a and a radially inner wall 62b that define a generally annular combustion chamber 55 disposed about the engine axis A. Each of the radially outer wall 62a and radially inner wall 62b define outer walls that support first and second liner panels 64a-b and 66a-b. The first and second liner panels 64a-b and 66a-b define an inner surface 68 of the combustion chamber 55. The liner panels 68a-b, 70a-b are cooled with airflow through a plurality of film cooling air holes 88. The combustion chamber 55 reaches temperatures that are not suitable for most materials. Accordingly, cooling airflow is provided through the film cooling air holes 88 to maintain the liner panels 64a-b, 66a-b within an acceptable temperature ranges.

The first and second liner panels 64a-b, 66a-b are representative of a plurality of panels that extend from a forward portion 110 of the combustor 56 to an aft portion 112 of the combustor 56. The panels 64a-b, 66a-b, are disposed circumferentially about the engine axis A and extend axially between the forward portion 110 and the aft portion 112. The panels 64a-b, 66a-b are spaced apart such that radial gaps 74 are present between adjacent panels 64a-b, 66a-b.

Figure 3:
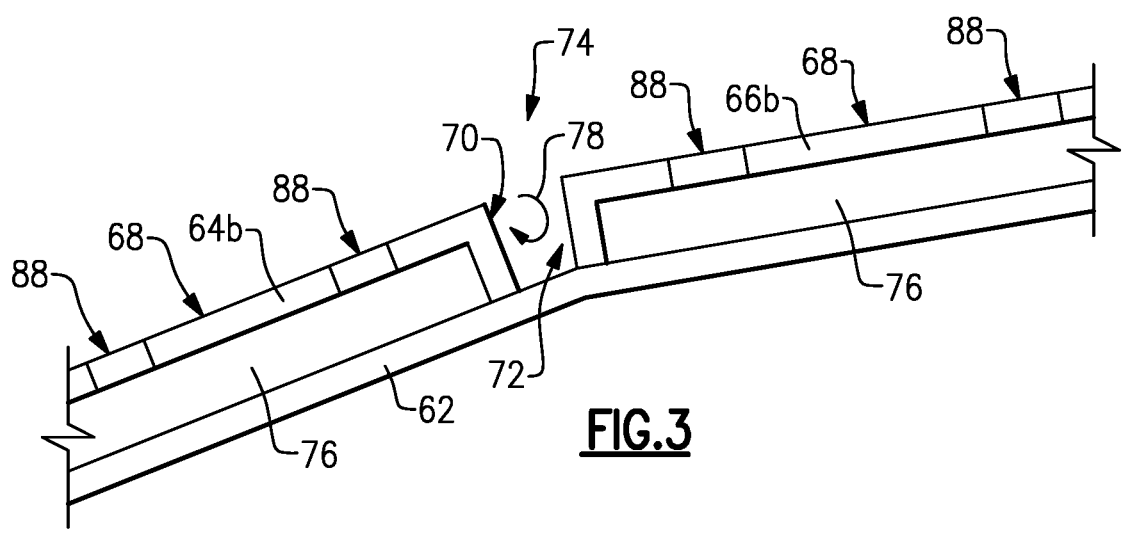
FIG. 3 is an enlarged cross-sectional view of an interface between two liner panels within the combustor assembly.

Referring to FIG. 3 with continued reference to FIG. 2, cooling air is provided to the film cooling air holes 88 through a passage 76 defined between the outer walls 62 and the liner panel 64a-b, 66a-b. Cooling air may also be provided to the radial gap 74 from the passage 76.

The radial gap 74 is conducive to the formation of a circulating low pressure vortex schematically indicated at 78 in FIG. 3. The radial gap 74 is defined between an aft end face 70 of the first liner panel 64a-b and a forward face 72 of a second liner panel 66a-b. The first liner panel 64a-b is disposed forward of the second liner panel 66a-b such that the forward face 72 faces forward and the end face 70 faces aft. The low pressure vortex 78 within the gap 74 entrains hot combustion flow that can result in undesirably high temperature air recirculating between the liner panels 64a-b, 66a-b. The recirculating air is at a lower pressure than the hot combustion flow and therefor remains within the gap.

Cooling air is provided to the film cooling air holes 88 through a passage 76 defined between the outer walls 62 and the liner panel 64a-b, 66a-b.

Figures 4, 5:
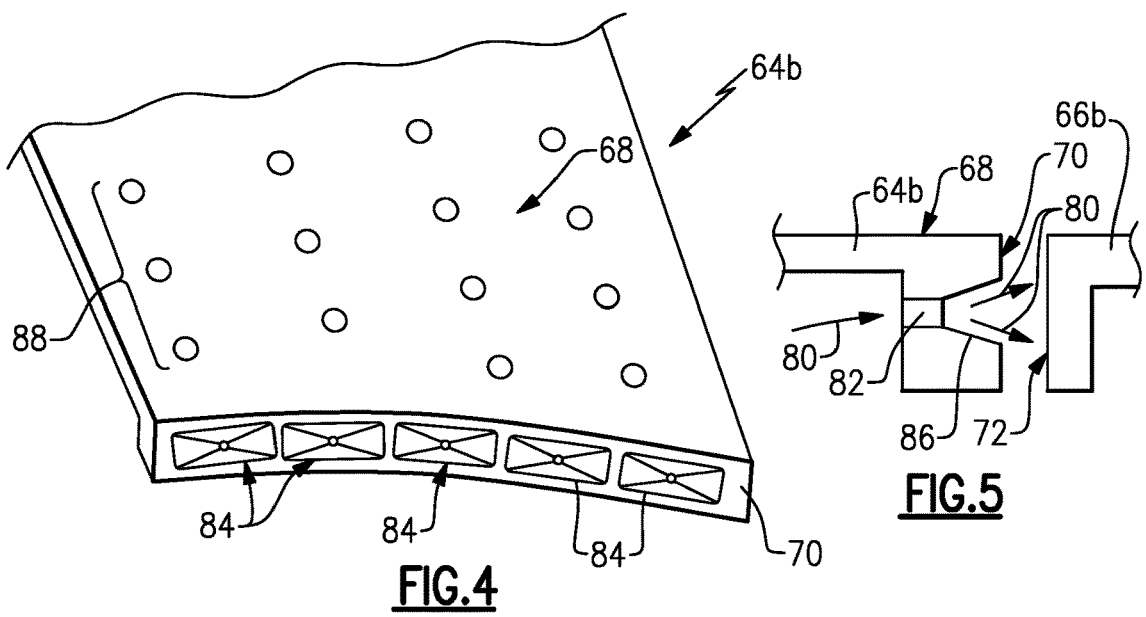
FIG. 4 is a perspective view of an example panel liner embodiment.
FIG. 5 is cross-sectional view of a portion of the example panel liner.

Referring to FIGS. 4 and 5, the end face 70 is transverse to the surface 68. The end face 70 includes diffusers 84 that direct cooling air into the gap 74. In this example, the end face 70 faces aft into the gap 74. Each of the diffusers 84 include a metering portion 82 and a diffuser portion 86. Cooling airflow 80 is communicated through the metering portion 82 and into the diffuser portion 86. The diffusers 84 reduce a velocity of cooling air 80 entering the gap 74. The reduction in cooling air velocity through the diffuser portion 86 increases a static pressure within the gap 74. Increasing the static pressure of cooling air within the gap 74 substantially equal to or above a pressure of the higher energy gas flow generated in the combustor chamber 55 minimizes or prevents entrainment of combustion gases within the gap 74. The undesirable low pressure vortex is not formed within the gap 74. Instead, the higher static pressures of cooling air flow 80 prevent incursion of combustion gases from entering the gap 74. Accordingly, the example diffuser portions 86 slow the velocity of the cooling airflow 80 that in turn provides an increased static pressure of cooling air entering the gap 74. The increase in static pressure prevents accumulation of hot combustion gasses within the gap 74.

The disclosed example includes diffusers 84 on one of the end face 70 and forward face 72. The diffusers 84 may be flush with the surface of the end face 70. The diffusers 84 may also be recessed into the end face 70. It is within the contemplation of this disclosure to provide diffusers 84 on both the end face 70 and a forward face 72 or on just the forward face 72.

Figures 6, 7:
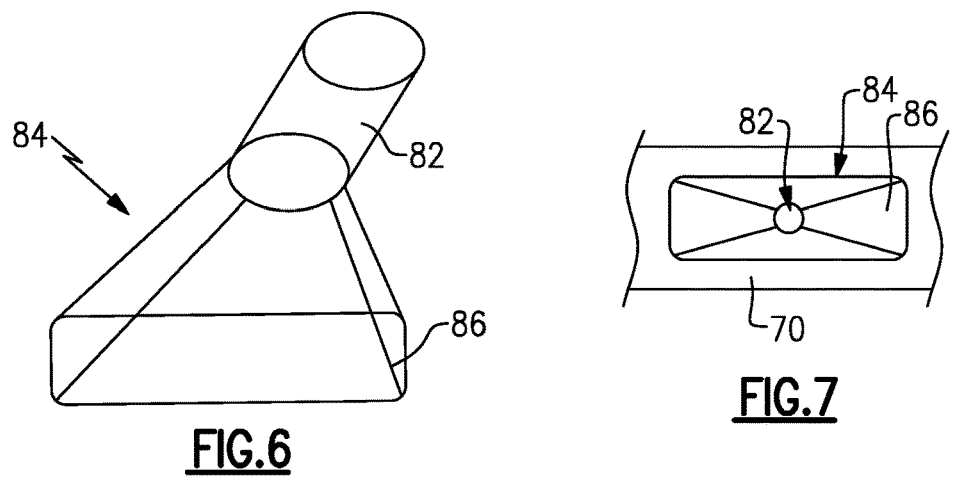
FIG. 6 is a schematic view of an example diffuser.
FIG. 7 is an end view of the example panel liner.

Referring to FIGS. 6 and 7 with continued reference to FIG. 4, the example diffuser 84 includes the diffuser portion 86 and the metering portion 82. The diffuser portion 86 can include a formation that is designed to be adjacent other diffusers such that the entire end face 70 that faces the gap 74 is substantially filled with diffusers 84.

Figures 8A, 8B:
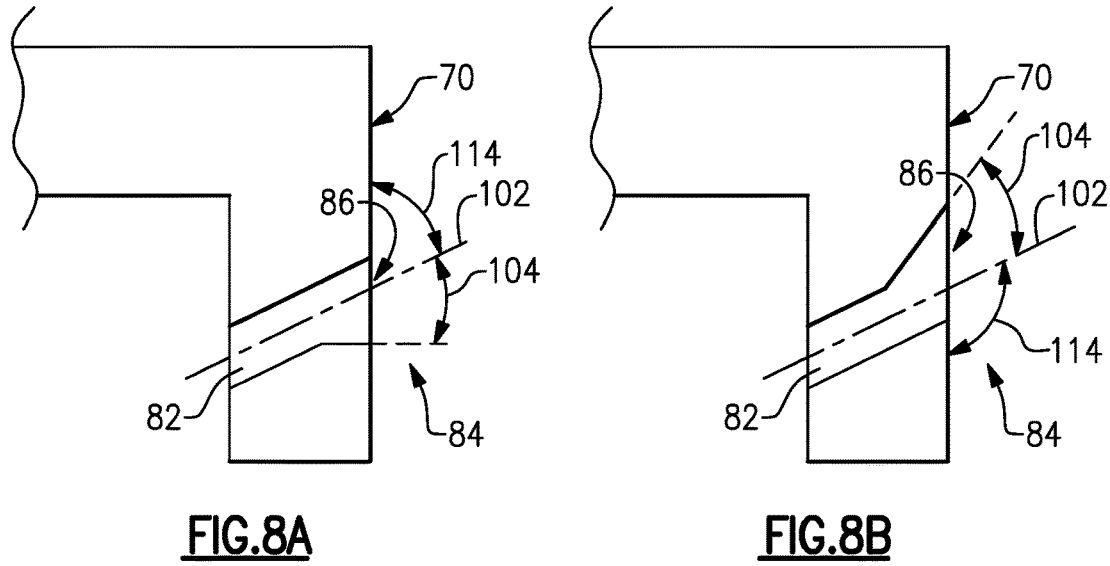
FIG. 8A is a side schematic view of the example diffuser.
FIG. 8B is a side schematic view of another example diffuser.
Figure 9:
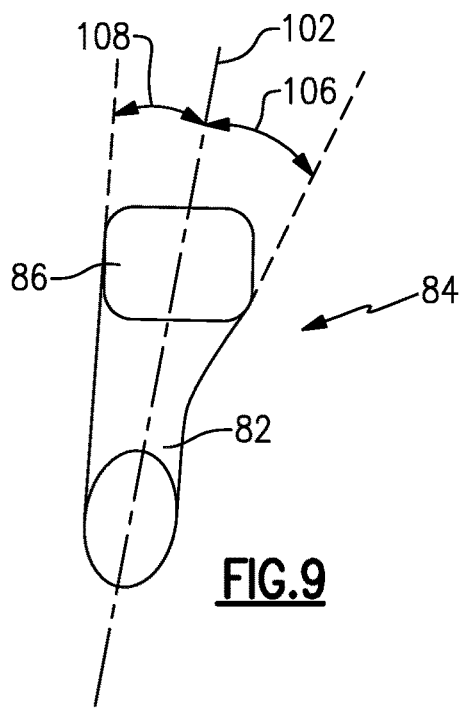
FIG. 9 is a schematic view of a diffuser portion of the diffuser.

Referring to FIGS. 8A, 8B and 9 with continued reference to FIGS. 6 and 7, the example diffuser 84 includes a forward angle 104 and a lateral angle 106. Diffuser portions are described by angles of surfaces relative to a longitudinal axis 102 of the metering portion 82. The longitudinal axis 102 may be disposed at an angle 114 relative to a surface of the end face 70. The lateral angle includes a first lateral angle 106 and a second lateral angle 108 on either side of the longitudinal axis 102. The diffuser portion 86 is therefore described by three numbers indicating the first lateral angle 106, the second lateral angle 108 and the forward angle 104.

In one example embodiment, the forward angle 104 is 10° degrees and one of the lateral angles 106 is 10° degrees. In the example embodiment illustrated in FIGS. 8A, 8B and 9, the diffuser cooling hole is known as a 10-0-10 cooling hole. This designation indicates that one of the first lateral angle 106 is 10° degrees, the second lateral angle 108 is 0° degrees and the forward angle 104 is 10° degrees. In FIG. 8A, the forward angle 104 is radially inward of the axis 102. In FIG. 8B, the forward angle 104 is radially outward of the axis 102. The radial position of the forward angle 104 can be utilized to direct airflow as desired. It should be appreciated that although a disclosed embodiment of the example diffuser 84 includes exemplary disclosed angles that other angles and shapes of the diffuser openings are within the contemplation of this disclosure. In a further disclosed embodiment, the diffuser 84 includes a forward expansion angle between 0° and 15° degrees. In another disclosed embodiment, the forward expansion angle is between 0° and 45° degrees. In another disclosed embodiment, the forward expansion angle is 45° degrees.

In another example embodiment, the lateral expansion angles 106, 108 is between and 5° and 14° degrees. In another example embodiment, the lateral expansion angles 106, 108 is between and 5° and 45° degrees. In another example embodiment, the lateral expansion angle is 45° degrees. In the embodiment illustrated in FIG. 9, the diffuser 84 includes a lateral expansion angle that is not symmetrical about the longitudinal axis 102.

Figure 10:
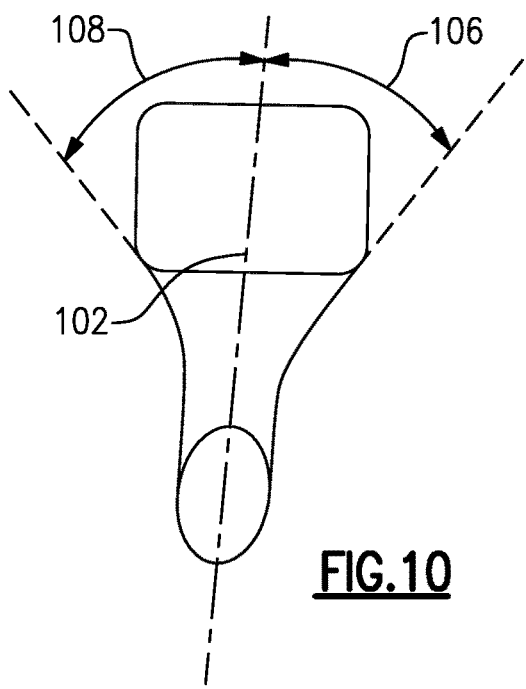
FIG. 10 is a schematic view of another example diffuser portion.

Referring to FIG. 10, in another example embodiment of the diffuser 84, the lateral angles 106, 108 are the same and therefore are symmetric about the longitudinal axis 102.

In another example embodiment, the forward expansion angle 104 and the lateral expansion angles 106, 108 are the same. In still another example embodiment, the forward expansion angle 104 and the lateral expansion angles 106, 108 are different. It should be understood that diffuser opening configurations can be modified to provide the desired static pressure increases and may differ in angle and shape from those discloses and remain within the contemplation of this disclosure.

Figure 11:
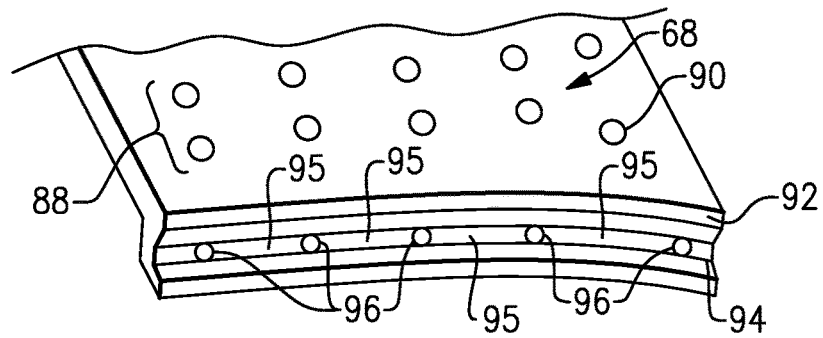
FIG. 11 is a perspective view of another example panel liner embodiment.
Figure 12:
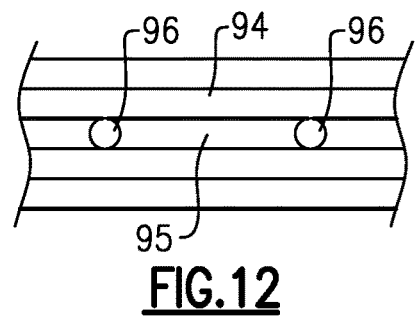
FIG. 12 is an end view of the example panel liner shown in FIG. 11.

Referring to FIGS. 11 and 12, another example liner panel 90 includes an end face 92 that includes a groove 94. The groove 94 includes a plurality of cooling air openings 96 that extend into a groove diffuser 94 that extends continually along the end face 92. The groove diffuser 94 includes surfaces angled such that airflow through the openings 96 enter the gap 74 and generate static pressure higher than the pressure of the combustor flow across the gap 74. A surface 95 between the openings 96 can be an outward protruding rib to provide some separation between the openings 96. The surface 95 between the openings 96 may also be flush or flat between the openings 96. The higher pressure within the gap 74 provided by the diffuser portion 94 prevents or minimizes the entrainment of hot combustion gasses within the gap and prevents degradation of the liner panel The example groove diffuser 94 may include an angle of approximately 45 degrees. The groove diffuser 94 may be a single continuous circumferential groove or may be segmented about the circumference of the combustor.

Accordingly, example disclosed combustor liner panels include diffuser cooling openings that slow cooling airflow into gaps between panels to increase static pressure and prevent entrainment of hot combustion gasses.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A combustor assembly for a turbine engine comprising:
    a first liner panel defining a portion of an inner surface of a combustor chamber, the first liner panel including a first aft end face transverse to the inner surface;
    a second liner panel disposed adjacent the first aft end face of the first liner panel, the second liner panel including a forward end separated from the first aft end face by a gap; and
    at least one diffuser through the first aft end face, wherein the diffuser is a groove diffuser that comprises a groove centered in a radial direction on the first aft end face and extends continually across the first aft end face.

2. The combustor assembly as recited in claim 1, wherein the diffuser includes a diffuser portion on the first aft end face and a metering portion through the first aft end face into the groove diffuser.

3. The combustor assembly as recited in claim 2, wherein the first aft end face is on an aft end of the first liner panel.

4. The combustor assembly as recited in claim 2, wherein a plurality of metering portions open into the groove diffuser.

5. The combustor assembly as recited in claim 1, wherein the first liner panel comprises a plurality of first liner panels arranged circumferentially about the engine axis and the second liner panel comprises a plurality of second liner panels arranged circumferentially about the engine axis.

6. The combustor assembly as recited in claim 1, wherein the inner surface comprises a plurality of cooling air holes injecting cooling air through first liner panel.

7. The combustor assembly as recited in claim 1, wherein the groove diffuser includes a forward expansion angle relative to a longitudinal axis of the diffuser that is between zero and 45°.

8. The combustor assembly as recited in claim 1, wherein the diffuser includes a forward expansion angle of between 5° and 45°.

9. The combustor assembly as recited in claim 1, wherein the groove diffuser includes a forward expansion angle is 45°.

10. A liner panel for a combustor assembly of a gas turbine engine, the liner panel comprising:
    a surface defining an inner surface of a combustor;
    an end face transverse to the inner surface;
    at least one groove diffuser through the end face, the groove diffuser comprising a groove centered in a radial direction on the end face that extends continually across the end face; and
    a plurality of openings that include a metering portion that extends through the end face into the groove diffuser.

11. The liner panel as recited in claim 10 wherein the groove diffuser includes a forward expansion angle relative to a longitudinal axis of the groove diffuser that is between zero and 45°.

12. A method of assembling a combustor for a turbine engine comprising:
    forming a first liner panel to include a surface, an aft end face transverse to the surface and at least one diffuser within the aft end face, wherein the diffuser is a groove that is centered in a radial direction on the aft end face and extends across a. circumferential width of the aft end face and forming the first liner panel includes forming a plurality cooling air holes to extend through the aft end face into the groove of the diffuser;
    assembling the first liner panel within an outer wall of a combustor to define an inner surface of the combustor; and
    assembling a second liner panel separated from the aft end face of the first liner panel by a gap.

13. The method as recited in claim 12, including forming the diffuser to include includes a forward expansion angle relative to a longitudinal axis of the diffuser that is between zero and 45°.

* * * * *